UNITED STATES PATENT OFFICE 2,636,823

METHOD OF MAKING BIOSYNTHESIZED PRODUCT

George I. de Becze, Cincinnati, Ohio, assignor to Schenley Industries, Inc., a corporation of Delaware No Drawing. Application November 10, 1947, Serial No. 785,187

2 Claims. (Cl. 99—9)

My invention relates to the production of certain growth factors or growth materials, by treating aqueous nutrient media with microorganisms which primarily comprise the bacteria of the colon-Aerobacter group of the Tribe-Eschericheae. While I can use micro-organisms of the Tribe-Eschericheae which are not members of the colon-Aerobacter group, I prefer to use such colon-Aerobacter group. One or more of the colon-Aerobacter bacteria can be used without other selected micro-organisms, or optionally and preferably conjointly or successively or in symbiosis with selected micro-organisms of other groups, such as yeasts, other bacteria, molds, etc. If said colon-Aerobacter bacteria are used alone, they produce said growth factor or factors, and the use of Aerobacter bacteria or colon-Aerobacter bacteria alone, namely without conjoint use of micro-organisms of other groups, is one of the important features of my invention. The yeasts which I can use conjointly with said Aerobacter bacteria or said colon-Aerobacter bacteria include *Saccharomyces cerevisiae* and *Torula utilis*, without being limited to said yeasts.

The *Saccharomyces cerevisiae* is an example of yeasts which produce ethyl alcohol by fermenting sugars and other carbohydrates. The *Torula utilis* is an example of yeasts which do not produce ethyl alcohol by fermenting carbohydrates. This yeast has been designated as Torulopsis in later scientific literature.

By using bacteria of the colon-Aerobacter group, in an aerobic process, I biosynthetically produce in a suitable nutrient medium, a growth material which has the same effect as growth material which is produced anaerobically in the bodies of human beings and animals. If the original medium has original proteinaceous material, I may substantially increase the same. I thus enrich the starting material by a proteinaceous growth factor or by a group of growth factors which have not yet been wholly chemically identified. It has been proved that whole liver substance contains growth material which has the same effect as the growth material which I produce by biosynthesis. This has been demonstrated by rat bioassays, using sulfonamide diets for the rats. By employing this technique, it has been found that the growth of rats resulting from sulfonamide diets, supplemented with one or more of the end-products of my process, is practically as good as that which is obtained when whole liver substance is used as a supplement to such diet in the same amounts.

It is well known that fish meal is rich in one or more growth factors which have not yet been wholly identified. This has been demonstrated in chick bioassays, by supplementing their ordinary rations with fish meal, thus producing better growth. In comparable bioassays, it has been demonstrated that the growth of chicks on diets which have been supplemented with one or more of the growth factors of my process, is at least as good as that resulting from the same diets when similarly supplemented with fish meal.

When subjected to certain deficient diets, dogs develop a dermatitis which may spread over their whole bodies. It has been demonstrated that when such deficient dog diets are supplemented with one or more of the growth factors produced by my process, such dermatitis is cured or at least alleviated. In such case, favorable results are observed within one week, and cures are ordinarily secured within a period of four weeks.

These bioassays have shown that at standard feeding levels, the new modified proteinaceous materials are nontoxic to animals.

My process also results in the enrichment of the starting material in various members of the "B" vitamins and this is one of the advantages of my invention. However, a great advantage of my invention is in the production of the above-mentioned growth factor or factors which have the same or substantially the same growth effect as whole liver substance and fish meal. These unknown growth factors are primarily wholly different from the members of the "B" vitamin group which have heretofore been identified, such as biotin, folic acid, niacin, riboflavin, thiamin, pantothenic acid, pyridoxine and para-amino-benzoic acid.

According to my invention, I can use various starting materials, which may be suitably supplemented or treated or modified as later stated herein, depending on the respective starting material. I use these starting materials in aqueous solution or suspension or dispersions, with a suitable percentage of water.

I can use and I include, as starting materials, many of the commonly produced waste products or by-products of various industrial processes, such as the residues which result from the production of various antibiotics, from the production of feeds, foods, starches, sugars, and also the waste products of various fermentation processes.

For example, and without limiting my invention thereto, I can use the residual broth which results from a penicillin-producing fermentation and the subsequent extraction of the penicillin from the fermented broth. In addition to said broth and other by-products, I can use the mycelium of the penicillin-producing mold, and such mycelium, alone is a valuable ingredient of a starting material which I can use. I can also use the waste products of the dairy industries, and waste products which result from the extraction of starch from various raw materials such as corn and the like. Another valuable starting material is the residual still material which results from the fermentation of mashes of various carbohydrate materials by yeasts, such as Saccharomyces cerevisiae, to produce a fermented distillers' beer which contains ethyl alcohol, followed by the distillation of the ethyl alcohol from the resultant distillers' beer. This residual still material is designated as "distillers' stillage" or "distillers' slop."

I can also use suitable dilute aqueous solutions of molasses. I can also use corn-steep liquor, the spent liquor or butyl-acetonic fermentation, the spent liquor of lactic acid and citric acid fermentations, by-products which result from the processing of fish and meat, such as blood and "stick" water (which is a nitrogenous product which results from the processing of fish and meat) paper mill waste, amino acids, whey which is produced as a dairy waste, cannery waste and the by-products of canning operations, and spoiled or autolyzed bakers' or brewers' or distillers' yeast.

By means of my process, I can utilize, as an ingredient or ingredients of the starting material, a vegetable protein or vegetable proteins. In this substrate of vegetable-origin, I form a growth factor or growth factors which have the same growth effect as growth material which ordinarily is found only in proteinaceous material of animal origin.

The fraction of distillers' by-products which is produced by drying the distillers' stillage after its coarse particles have been removed by screens, is commonly known as "distillers' solubles." This dry fraction usually contains about 22%–28% of protein by weight, if the original mash has been made with one or more cereals. This dry fraction contains about the following amounts of vitamin "B" factors per gram of total solids; 15 micrograms riboflavin, 80 micrograms, niacin, 2 micrograms PGA (pteroyl glutamic acid), 6 micrograms pyridoxine, and 3 milligrams choline. These "B" vitamins are principally synthesized by the yeast cells during the fermentation of distillers' beer. PGA (pteroyl glutamic acid) refers to folic acid.

My process preferably comprises the following major steps:

Step A.—Preparation of the inoculum.

Step B.—Pre-treatment of the medium.

Step C.—Processing the end-product of Step B, while using the end-product of Step A as an inoculum.

Step D.—Processing the end-product of Step C.

In the following, I have specifically described the preparation of an *Aerobacter cloacae* inoculum. These directions apply generally to the preparation of inoculi of other Aerobacter bacteria, particularly, colon-Aerobacter bacteria, subject to possible changes which depend upon the respective microorganism.

Also, I have described my method in detail, relative to the treatment of distillers' stillage, which results from the production of rye whiskey or Bourbon whiskey. Rye whiskey is made from rye and malt. Bourbon whiskey is prepared from maize, malt and rye. These directions apply generally to other starting materials, subject to variations which depend upon the respective starting material.

STEP A

Preparation of the inoculi

1. PREPARATION OF BACTERIAL INOCULI (a) *Stock culture.*—A pure culture of *Aerobacter cloacae* is maintained at 30° C., on the surface of sterile aqueous agar nutrient media which contains carbohydrate nutrient matter, as 3% by weight of glucose; nitrogenous nutrient matter, as 0.1% by weight of peptone; agar-agar, as 1.5% by weight; nutrient salts, such as dibasic potassium phosphate, $K_2HPO_4$; and traces of auxiliary salts such as sulfates of iron and magnesium, aluminum, zinc, such as are commonly employed in bacteriological practice. The above percentages by weight are calculated upon the entire weight of the nutrient medium. The virulence of these cultures is maintained by weekly transfers to the same or similar media. The same applies to other bacteria, such as, for example, *Aerobacter aerogenes, E. coli,* and other micro-organisms which I can use and which propagate under aerobic conditions.

(b) *Later generations.*—The bacteria are grown for not less than one day on the aforesaid sterile aqueous agar medium at substantially 30° C. I then suspend the bacteria grown on the surface of 10 ml. (10 cubic centimeters) of said stock culture, either in 5 ml. of sterile physiological or isotonic sodium chloride solution, or in 5 ml. of sterile distilled water. This is done at 20° C.–25° C. The 10 ml. of said stock culture are optionally thoroughly intermixed with said 5 ml. sodium chloride solution or with said 5 ml. of water. This mixture or suspension is transferred at 20° C.–25° C. to 10 ml. of sterile aqueous nutrient medium. This sterile aqueous nutrient medium has a pH of substantially 5. In addition to the water, this sterile aqueous nutrient medium has substantially 3% of glucose, 0.2% of peptone, 0.05% of a standard yeast extract as "Difco" yeast extract, 0.05% of dibasic potassium phosphate or calcium superphosphate, and traces of one or more of said auxiliary salts, as ferrous sulfate, etc. These proportions are by weight calculated upon the total weight of the aqueous nutrient medium. Said 100 ml. of said aqueous nutrient medium are contained in a sterile 500 ml. Erlenmeyer flask. Said mixture or suspension of the stock culture with said isotonic sodium chloride solution or with distilled water, is thoroughly mixed with said 100 ml. of aqueous nutrient medium. The 400 ml. of air in said flask supplies the neecssary air for aeration, when the plugged flask is shaken. This air is sterile. The temperature is maintained at about 30° C., during vigorous agitation and aeration in the plugged flask with sterile air, under aseptic conditions, in a shaking device for a period of one to two days. The entire mixture is then transferred into 1 liter of aqueous sterile nutrient media, with a composition which is the same or similar to the one described above, contained in a five-liter propagating flask. The mixture is agitated and aerated with sterile air in the plugged propagating flask, by shaking at a temperature of about 30° C. for about 24 hours. The mixture is then transferred to another propagating container having a volume of 20 liters and containing 10 liters of sterile aqueous nutrient medium as above described, and the mixture is vigorously agitated at about 30° C. for about 24 hours.

This inoculum which is thus prepared, designated as "later generation inoculum," is the inoculum which is used in Step C, optionally and preferably jointly or in symbiosis with a yeast inoculum, to inoculate the distillers' stillage or other medium.

Such a "later generation inoculum" has sufficient strength so that the processing of the medium in Step C, under the conditions stated in Step C, results wholly from said "later generation inoculum," unless this is optionally used conjointly with another microorganism, such as a yeast, as later described. Hence, if there is any accidental contamination from contaminating microorganisms which occur usually as contaminants of the fermenting plant, the action of such accidental plant contaminants is minor or negligible, because of the vigorous proliferation of said "later generation inoculum." I prefer that the "later generation inoculum" should be a pure and virulent *Aerobacter cloacae* inoculum, but my invention is not limited thereto.

STEP B

*Pre-treatment of the medium which is to be inoculated*

The medium to be used is preferably diluted with water to a solid content, such as about 4% by weight. The solids of such solid content are preferably limited to dissolved solids and to finely suspended solids, as in "distillers' thin stillage," in which the coarse particles have been removed from the original still residue. Depending upon the nature of the raw material, it may be necessary to carry out one or more or all of the following steps before reaching the final aqueous dilution of the medium, namely—separation of inert substances from the original or starting medium; hydrolysis of the solids of said medium; supplementation of said medium; pH adjustment of said medium, sterilization, etc.

For instance, when "distillers' stillage" is used as the starting medium, the bulk of its coarse and undissolved material is preferably removed by any suitable mechanical means, as by screening. The resultant "distillers' thin stillage" medium is optionally diluted with water to a solid content of 1%–4% by weight and it is then supplemented with 0.2 gm. of calcium carbonate per 100 ml. of diluted medium, 0.1–0.2 gm. of ammonium sulfate per 100 ml. of diluded medium, and 0.1 gm. per said 100 ml. of calcium superphosphate. This is the commercial name of the product which is obtained by adding sufficient sulfuric acid to calcium phosphate to convert the insoluble salt to water-soluble $H_4Ca(PO_4)_2 \cdot H_2O$. At the same time, a considerable amount of water-insoluble calcium sulfate is formed. The pH is adjusted to 5–5.5 by the addition of hydrated lime. If the "distillers' thin stillage" has been properly prepared it will not contain live cells in excess, so that it is unnecessary to sterilize it by heat, as the last step before submitting it to inoculation. Sterilization by heat and cooling to 30° C., prior to inoculation, is optional. In any event, the medium is preferably sterile prior to inoculation. If, for instance, the waste products of starch manufacture are used, such waste products are made into a water paste, which is cooled and converted by hydrolysis with amylase in the usual manner. The resulting product which is thus secured from the waste products of starch manufacture is diluted with water to 1–4% of solids by weight, and supplemented and otherwise treated as described for "distillers' thin stillage." However, it is optionally sterilized by heat prior to inoculation, and it is then cooled to about 30° C. If, for instance, raw beet or cane molasses is used, it is diluted with water to 1–4% of solids, and supplemented and otherwise treated as described for said "distillers' thin stillage." If, for instance, I use penicillium mycelium, which is a residue of the production of penicillin, said mycelium is ground, then diluted with water to 1–4% by weight, allowed to autolyze, and supplemented and otherwise treated as described for said "distillers' thin stillage."

STEP C

*Processing the end-product of Step B, using the end-product of Step A as inoculum*

The processing of the pre-treated medium comprises (I) inoculation of the medium, (II) aeration, (III) agitation, (IV) temperature control, (V) pH control.

(I) The inoculation consists of the transfer of inoculum, prepared as described under "Later generations" and designated as "later generation inoculum," to the pre-treated "distillers' thin stillage" or other medium. It is preferred to add 2–4% by weight of said "later generation inoculum." The pre-treated medium is treated with said "later generation inoculum" consisting wholly or principally of one of the colon-Aerobacter organisms mentioned in Step A or with two or more of them, selecting the most suitable colon-Aerobacter organism or combination of colon-Aerobacter organisms, according to the raw material to be processed and depending upon the desired final product. When more than one type of "later generation inoculum" is used, transfers into the pre-treated media may be made simultaneously or at intervals of several hours.

I prefer to use a pure "later generation inoculum" of *Aerobacter cloacae*, but the invention is not limited thereto, and I prefer to add such entire "later generation inoculum" of *Aerobacter cloacae* in one batch to the pre-treated medium, at about 30° C.

(II) Aeration and agitation are preferred to start simultaneously with, or slightly before, the first inoculation, using tall processing tanks. Such a tank may be a vertical cylindrical tank which has a diameter of 10 feet, and in which the pool of medium has a height of 30 feet. The air, which may be sterile or non-sterile, is introduced at the bottom of the tank and bubbled upwardly through the liquid batch of medium. For each one thousand liters of the batch, I preferably supply air per minute at the rate of 50 liters of air to 300 liters of air. This aeration is continued during the entire period of 24–48 hours, while a temperature of 26° C.–34° C. is maintained.

(III) The vigorous agitation of the medium, during the entire period of aeration, is continuously carried out by any suitable means, preferably by eccentrically located high-speed propellers submerged in the liquid medium so that the air bubbles are vigorously and continuously mixed with the liquid, thus producing uniform and vigorous aeration during said period of 24-48 hours. The proliferation is thus carried out under conditions of submerged culture.

(IV) The temperature is controlled by any suitable means, preferably by cooling coils submerged in the medium, or by cooling jackets surrounding the processing tank. It is preferred to keep the temperature of the batch in said range of 26° C.-34° C., for the entire period of treatment, usually 24-48 hours.

(V) The pH of the distillers' thin stillage which has been adjusted to 5-5.5, preferably 5.5, prior to inoculation, increases in the batch to a final pH of 7.5-8. This increase in pH applies to other mediums. At the end of the entire treatment of 48 hours in the processing tank or optionally at the end of 24 hours of said treatment, the final pH is reduced to 5.0-5.5, as by the addition of an acid, such as sulfuric acid.

STEP D

Processing the end-product of Step C

The end-product of Step C is evaporated under a pressure of 200 mm. of mercury at a temperature preferably below 70° C., such as 50° C., to a thick syrup, usually containing 25%-35% of solids by weight. This syrup may be used for feed purposes, as it is especially rich in vitaminic matter and it is rich in said unknown growth factor or growth factors. This syrup may be further dehydrated to a solid content of 95% by weight by any suitable means, such as spray drying, vacuum drum drying, etc., keeping the temperature of concentration preferably below 70° C.

Determination of enhanced biological activity

Comparable analytical and bioassay data have been obtained for the end-products of my process. Chemical analyses have shown that the vitamin content and the protein content of the starting material are significantly increased, especially if yeast inoculum is used jointly with the colon-Aerobacter. The vitamin analyses have been carried out by chemical and microbiological methods. It has thus been found that my process permits the enrichment of the raw starting materials in a number of B-vitamins. It has been observed that, for example, the biotin, folic acid (PGA) (pteroyl glutamic acid), niacin, pantothenic acid, and pyridoxine content have been readily tripled and that the riboflavin content has been increased as much as ten times the original riboflavin content of "distillers' thin stillage." In the specific examples later set forth I have limited my statements to the increased riboflavin content, since I have found that riboflavin enrichment may serve as a general criterion for vitamin enrichment. Bioassays carried out with rats as well as with chicks have demonstrated that my process permits the enrichment of the raw materials, in said as yet unidentified growth factor or group of growth factors. As above noted, it is now known that whole liver substance contains one or more of these growth factors, which may be demonstrated in rat assays using sulfonamide diets supplemented with whole liver substance. Employing this technique, it has been found that the growth of rats resulting from sulfonamide diets supplemented with one or more of the end-products of my process is practically as good as that obtained when whole liver substance is used as a supplement in the same amounts. In chick assays, rations supplemented with fish meal usually permit better growth than those containing no animal protein. In comparable bioassays, it has been observed that the growth of chicks on diets supplemented with one or more of the end-products of my process, is at least as good as that resulting from diets supplemented with fish meal. Thus, it has been demonstrated that my process permits the biosynthesis of biologically-active matter of an as yet unidentified nature and seemingly occurring in whole liver substances as well as in fish meal, although the active material in my end-products may not be identical with that of whole liver substance and fish meal.

The following examples include some incomplete examples which do not utilize all the features of my process.

EXAMPLES OF THE PROCESS

Example No. 1.—Incomplete process

The raw material, namely, distillers' entire stillage prepared from cereals, as received from the beer still and having 8% solids by weight, was cooled to a temperature of 30° C., then inoculated at 30° C. with 2% by weight of "later generation inoculum" of Aerobacter cloacae which was prepared as described under Step A, and allowed to stand for 24 hours without aeration orf agitation at 28° C.-30° C. The final product was then evaporated and dried to a solid content of 95% at a temperature varying between 65° and 70° C., at a pressure of substantially 200-250 mm. of mercury. As previously stated, this starting material can be initially diluted with water to 1%-4% of solids, and this is preferred, since it improves the process. In making this test, the "distillers' entire stillage" was not so diluted. The analysis of the dried product indicated that the raw material had not been enriched by the process in proteinaceous matter, and that only a 5%-10% increase in the original content of riboflavin of said distillers' entire stillage had occurred. The dried by-product did not indicate noticeable quantities of the growth factors, when tested by animal experiments. Hence this example is not within the scope of my invention, and it is used to illustrate the advantage thereof, as described in more complete examples.

Example No. 2.—Incomplete process

The bulk of the coarse suspended particles of the distillers' entire stillage designated in Example 1 was removed by screening, resulting in an aqueous liquid "distillers' thin stillage" which had 6% solids, to every 100 ml. of which was added 0.1 gm. ammonium sulfate, 0.1 g. of calcium superphosphate, and also 0.2 g. of calcium carbonate. The pH was adjusted from about an original pH of 4, to a pH of 5.5, by the addition of hydrated lime. This aqueous medium was sterilized and cooled to 30° C., inoculated at 30° C. with 2% by weight of liquid "later generation inoculum" of Aerobacter cloacae prepared as described under Step A, and treated according to Example 1, while maintaining the temperature at substantially 30° C., for 24 hours. The final product was evaporated and dried to a solid content of 95% at a temperature between 65 and 70° C., at the above-mentioned pressure.

The original riboflavin content was about 14 micrograms per gram of solids. This was increased to 20 micrograms of riboflavin per gram of solids. The dried by-product did not indicate noticeable quantities of the growth factors, when tested by animal experiments. Hence this example, like Example No. 1 is not within the scope of my invention, and it is used to illustrate the advantages thereof, as described in more complete examples.

*Example No. 3.—Incomplete process*

Each step was performed as described in Example No. 2, using "distillers' thin stillage" which had 4.5% by weight of solids, with the addition of the following step: after said inoculation, the pre-treated medium was vigorously agitated and aerated with air. Per one thousand liters of the batch, I supplied air per minute at the rate of 50 liters of air to 300 liters of air. The processing period under said aeration was 24 hours, as in Example 2. The pH of the liquid which had increased to above 7, was then adjusted to about 5.5 by the addition of sulfuric acid. The liquid was dried to 95% solids at a pressure of 200–250 mm. of mercury and at a temperature between 65° C.–70° C. The analysis of the dried product indicated a 15% increase by weight in proteinaceous matter. In this example, the starting material had 12 micrograms of riboflavin per gram of solids. This was increased to 60 micrograms of riboflavin per gram of solids, namely, an increase of about 500%. The product obtained, when tested by animal experiment, indicated the presence of growth factors. Hence this example, which uses aeration, is within the scope of my invention.

*Example No. 4.—Complete process*

The process was carried out as described in Example No. 3, the difference being that said screened or thin "distillers' stillage", before adding the inorganic supplements stated in Example No. 2, was diluted with water to a solid content by weight of 1%–4%. The analysis of the final product indicated a 20% increase in proteinaceous matter and an 800% increase in riboflavin, as calculated in Example No. 3. The product obtained, when tested by animal experiment, indicated the presence of growth factors. This example is within the scope of my invention.

*Example No. 5.—Complete process*

The process was the same as in Example 4, the difference being that the pre-treated liquid was first inoculated with 5% by weight of aqueous yeast inoculum and inoculated a second time, namely two hours later, with ½% by weight of "later generation inoculum" of *Aerobacter cloacae*. The analysis of the final product indicated 30% increase in proteinaceous matter and a 900% increase in riboflavin.

The liquid medium was continuously agitated and aerated, beginning with the addition of the aqueous yeast inoculum. The yeast of said yeast inoculum was *Saccharomyces cerevisae*.

Said aqueous yeast inoculum had 3% of said yeast by weight.

Instead of using an aqueous yeast inoculum, I can use bakers' yeast cake or purified brewers' yeast, preferably free from starch.

The weight of a cell of *Saccharomyces cerevisiae* is about 150 times the weight of an *Aerobacter cloacae*. In this combined inoculum, I can use one cell of *Saccharomyces cerevisiae* in one hundred *Aerobacter cloacae*. This ratio is not critical. The relation between the respective weights of these two microorganisms can be five to one, and either microorganism can have the major proportion. The distillers' thin stillage does not have sufficient carbon nutrient in the form of carbohydrate, to produce the mentioned large growth of yeast, which results in a part of the increase in proteinaceous material. The *Aerobacter cloacae* attacks the vegetable proteinaceous material and higher carbohydrates, thus supplying carbon nutrient for the yeast. The yeast aids the action of the *Aerobacter cloacae* so that there is a true combination or symbiosis.

There is little or no ethyl alcohol in the end product. Any ethyl alcohol which is formed during the fermentation by the action of the *Saccharomyces cerevisiae* is oxidized by aeration to produce carbon dioxide and water. The product obtained, when tested by animal experiment, indicated the presence of growth factors. This example is within the scope of my invention.

*Example No. 6.—Complete process*

The process was the same as in Example No. 5, the difference being that the diluted screened or thin "distillers' stillage," diluted to 1%–4% of solids by weight, was supplemented with 0.3 gram of ammonium sulfate per 100 ml. and 0.2 gram of calcium superphosphate per 100 ml. The analysis of the final product indicated a 55% increase in proteinaceous matter and a 900% increase in riboflavin.

In each of the examples stated herein, the raw starting material had none or substantially none of the valuable unknown growth factor or growth factors. Bioassays with chicks which have been made with the substantially dehydrated end-products of the respective Examples Nos. 3, 4, 5, and 6 of the complete process, have shown that the addition of 2.5% of said respective substantially dehydrated end-products to a standard ration, has the same beneficial growth effect as the addition of 5% by weight of fish meal.

The above examples apply specifically to the treatment of distillers' stillage, in which a cereal or mixture of cereals was used to make the original mash, and the method or methods disclosed herein generally apply to the various other waste materials which I can use as starting materials.

My invention is not necessarily limited to supplementing the respective starting materials, because such starting materials may occur naturally with the required supplemental substances or with one or more of them.

It is as yet impossible by analytical means to define the composition of the unknown growth factor or growth factors which I have thus produced by biosynthesis or to detect the same analytically by chemical methods. The only tests whereby these growth end-products can be identified is by bioassays.

In Example No. 1, I treated distillers' entire stillage with no aeration, and without supplementing this starting medium with calcium or phosphorus. Due to the lack of aeration and the low pH and the small content of phosphorus in the starting medium, the method of Example No. 1 did not result in any substantial enrichment of the aqueous starting material.

In Example No. 2, I supplemented the distillers' thin stillage with calcium superphosphate, with supplied nutrient calcium and phosphorus. I also added ammonium sulfate as a nutrient. I also adjusted the pH of the original distillers' thin stillage. I did not aerate or agitate. The enrichment of the starting material was slight.

In Example No. 3, I vigorously agitated and aerated in addition to the other steps of Example No. 2. This secured desirable results.

Example No. 4 illustrates the value of using a suitably diluted aqueous medium.

Example No. 5 shows the advantage of conjointly using a yeast inoculum, using the same rate of aeration as in Examples Nos. 3 and 4.

Example No. 6 shows the advantage of suitable dilution with water, and the advantage which results in an increase in the supplementation of ammonium sulfate and calcium superphosphate, using the same rate of aeration or oxygen supply as in Examples Nos. 3, 4 and 5.

If I use a plurality of selected micro-organisms, there are some cases in which the respective selected micro-organisms are compatible, so that they can propagate simultaneously with sufficient respective rapidity. In such case, I can optionally add the respective inoculi simultaneously to the medium.

In some cases, it may be desirable or necessary to add the respective inoculi successively at selected intervals. Thus, the first-added selected micro-organism can be permitted to propagate until it is at a sufficient level of concentration, so that it can continue effectively to propagate when a more active selected micro-organism is subsequently added.

Distillers' thin stillage, prior to the optional dilution with water to 1%–4% solids by weight, usually has less than 0.5% by weight of fermentable carbohydrate, when the original mash is made with the use of a mixture of cereals, such as ordinarly used in making rye whiskey or Bourbon whiskey. Such distillers' thin stillage requires no supplementation with carbohydrate in my process.

In some cases, depending upon the starting material, I can use carbohydrate enrichment, and in general, I can supplement or modify the starting material so as to provide all the nutritive ingredients for the efficient propagation of the selected micro-organism or selected micro-organisms.

In said distillers' thin stillage and in many other types of starting media, there is original water-insoluble proteinaceous material. This proteinaceous material may be in the form of a colloidal sol, or it may be in the form of a fine dispersion, which is not a colloidal sol. The invention is not limited to such type of starting material.

When I refer to proteinaceous material, I include simple proteins, conjugated proteins, derived proteins, including primary derivatives and secondary derivatives, and nucleoproteins. I also include the protein amino-acids. Depending upon the heat treatment of the starting material prior to inoculation, one or more of the proteins in the starting material may have been irreversibly coagulated by heat, when the inoculum is added.

I prefer to avoid any precipitation of the proteins prior to or during the propagation of the selected micro-organism or selected micro-organisms, but my invention is not limited thereto.

The starting material may contain a substantial proportion of fermentable carbohydrate, as when it is a mixture of beet molasses or cane molasses with water. Such molasses may be desaccharified to any desired extent, before using it as an ingredient of the starting material.

When the starting material is the aforesaid undiluted distillers' thin stillage which results from the production of rye whiskey or Bourbon whiskey, which contains 6% solids by weight, and less than 0.5% of fermentable carbohydrate by weight, I originally inoculate said aqueous medium, by means of the "Later generation inoculum," with 2 cc. of said "Later generation or inoculum" of *Aerobacter cloacae,* as an example, per 100 ml. of said medium. This applies generally to the inoculation of said diluted medium, which has 1%–4% solids by weight. This also applies generally to other Aerobacter bacteria and to other colon-Aerobacter bacteria, and to the inoculation of other media.

Some cells of the Aerobacter may remain viable in the end-product. Said end-product may be sterilized prior to using it as a feed or during the process, prior to dehydration.

The air which is used to supply the oxygen, is measured substantially under normal pressure of 760 mm. of mercury, so that the weight of the air supply per minute can be readily calculated. The rate of oxygen supply is about 20% of the rate of air supply.

Hence, if the batch of aqueous medium has a volume of one hundred thousand liters, which is a commercial batch, I may supply 5,000 liters of air to 15,000 liters of air per minute, corresponding to an oxygen supply of 1,000 liters to 3,000 liters per minute.

The minimum rate of oxygen supply is selected in order to propagate vigorously the selected Aerobacter or colon-Aerobacter micro-organisms, so as to inhibit the propagation of contaminant microorganisms.

In the original broth which is used to produce the "later generation inoculum," I use peptone, which is a water-soluble proteinaceous material. In treating distillers' stillage and many of the waste products which I improve, the original proteinaceous material is water-insoluble, such as proteinaceous material which comprises zein and other prolamins. In many cases the original proteins have been irreversibly coagulated or precipitated, due to prior treatment in the respective original process. Hence, in treating the starting material in order to convert the original content of proteinaceous material and to increase the original content of proteinaceous material, I deal with media which are wholly different from the ordinary synthetic broth.

Hence, in treating distillers' thin stillage and other media, I add water-soluble nitrogenous nutrient for the microorganism or microorganisms, as exemplified by ammonium sulfate. I can use other supplemental water-soluble nitrogenous nutrient, as many such nutrients are well-known. When the Aerobacter or colon-Aerobacter microorganisms reach a certain concentration or level due to propagation by submerged culture, I believe that they modify the original proteinaceous material, even if it is water-insoluble or heat-coagulated or precipitated, so as to produce the growth material. I can thus modify the prolamins to produce a very valuable end-product.

The increase in weight of original proteinaceous material, results from the production of such proteinaceous material by the Aerobacter or colon-Aerobacter microorganisms or yeast, in the bodies of said microorganisms. I do not limit the invention to the range of oxygen supply which is disclosed herein although this is the preferred rate, as this may vary, depending upon the respective Aerobacter or colon-Aerobacter microorganism, and upon the nutrient.

When I refer in the claims to the use of finely divided proteinaceous material, I do not limit myself to any specific particle size, or to a permanent suspension of the particles in the water. This propagation period of 24–48 hours is stated as one example of a propagation period, which may be less or more than 24–48 hours. However, I prefer to complete the process during such period, to secure efficient commercial production, and to inhibit contamination with contaminant putrefactive bacteria and other undesirable contaminant bacteria.

*Aerobacter aerogenes* produces the aforesaid growth factor but with much less activity than the highly preferred *Aerobacter cloacae*. I include *Aerobacter aerogenes* in the scope of my invention.

The Tribe-Eschericheae is identified in Bergey's Manual, 5th edition, published in April 1939, beginning at page 388.

I prefer to use a liquid inoculum of *Aerobacter cloacae* or other bacteria of the Tribe-Eschericheae, because it can be immediately intermixed with the aqueous medium in which the proteinaceous material is dissolved or dispersed or suspended. A part of the proteinaceous material may be dissolved, and the remainder of the proteinaceous material may be dispersed or suspended.

I can adjust the medium to any initial pH, which is optionally and preferably below 7, and optionally and preferably at least substantially 5.

By using a liquid and virulent inoculum of *Aerobacter cloacae* of other bacteria of said Tribe, I can initially add a relatively large volume of such inoculum to the aqueous medium. The selected bacteria are then proliferated at high rate, due to the vigorous aeration and agitation, thus aiding in preventing or inhibiting the proliferation of stray contaminant microorganisms which interfere with the desired action. I can thus complete the process within a short period, as 24–48 hours. By starting the aeration and agitation before adding the inoculum of *Aerobacter cloacae* or other selected microorganism, I initially thoroughly aerate the aqueous medium so that it initially has a maximum of dissolved air and it is full of air bubbles. If the aqueous medium is not initially aerated and agitated, such aeration and agitation preferably begin immediately upon the addition of the initial inoculum.

As previously noted, I may initially inoculate the medium with yeast, and grow or proliferate the yeast in said medium, before inoculating with the selected bacteria.

It is one of the features of my invention that the aqueous medium contains water-insoluble proteinaceous material. However, I do not limit the invention to this feature, because all or any part of the proteinaceous material in the aqueous medium may be water-soluble.

I do not limit the invention to the use of a medium which contains proteinaceous material. The aqueous medium may be of any type which has the required nutritional ingredients in order to proliferate the selected bacteria, or to proliferate the selected bacteria conjointly with a yeast.

When I refer to conjoint proliferation of the selected bacteria with a yeast, I include a method in which the respective inoculi are added simultaneously or in any selected succession, with any selected period before the successive addition of the respective inoculi.

I believe that the growth material may be produced, at least in part, in the bodies of the selected microorganisms, when proliferated under the conditions disclosed herein. Hence I do not limit my invention to the modification of the original water-soluble or water-insoluble proteinaceous material.

As one optional feature of my invention, I proliferate the selected bacteria in a medium which has an initial content of riboflavin.

Unless otherwise specifically stated in a respective claim, whenever I refer in any claim to proliferating a microorganism of the Tribe-Eschericheae, I include the proliferation of a plurality of said microorganisms.

When I specify in any claim that I produce the aforesaid growth material by my method, and that said growth material has substantially the same growth effect as whole liver substance or fish meal, I do not limit the invention to a process or product in which the new growth material has the same growth effect, gram for gram, as whole liver substance or fish meal.

I have described preferred embodiments of my invention, but numerous changes and omissions and additions and substitutions can be made without departing from its scope. The scope of my invention also includes the subcombinations of the complete processes disclosed herein.

I claim:

1. A process for modifying a proteinaceous material by the biosynthesis therein of growth promoting substances that comprises selecting a liquid proteinaceous nutrient medium; dissolving the medium soluble inorganic salts containing calcium, phosphorus, and nitrogen; adjusting the initial hydrogen ion concentration of the medium to within the range of approximately pH 5.0 to pH 5.5; inoculating the medium with a yeast of the species *Saccharomyces cerevisiae* and a culture of the microorganism *Aerobacter cloacae*; proliferating said yeast and microorganism symbiotically in the medium under aerobic conditions with agitation and aeration at a rate of approximately 50 to 300 liters of air per 1000 liters of medium per minute, while maintaining the temperature of the medium within the range of approximately 26° C. to 34° C., for a period of approximately 24 to 48 hours, until the hydrogen ion concentration of the medium lies within the range of approximately pH 7.5 to pH 8.0.

2. A process for modifying a proteinaceous material by the biosynthesis therein of growth promoting substances that comprises selecting a liquid proteinaceous nutrient medium; dissolving in the medium soluble inorganic salts containing calcium, posphorus, and nitrogen; adjusting the initial hydrogen ion concentration of the medium to within the range of approximately pH 5.0 to pH 5.5; inoculating the medium with a yeast of the species *Saccharomyces cerevisiae* and a culture of the microorganism *Aerobacter cloacae*; proliferating said yeast and microorganism symbiotically in the medium under aerobic conditions with agitation and aeration at a rate of approximately 50 to 300 liters of air per 1000 liters of medium per minute, while maintaining the temperature of the medium within the range of approximately 26° C. to 34° C., for a period of approximately 24 to 48 hours, until the hydrogen ion concentration of the medium lies within the range of approximately pH 7.5 to pH 8.0; neutralizing excess alkali in the medium by addition of an inorganic mineral acid;

and dehydrating the substantially neutral broth to obtain a dry solid product.

GEORGE I. DE BECZE.

References Cited in the file of this patent

UNITED STATES PATENTS

| Number | Name | Date |
|---|---|---|
| 1,733,962 | Hamburgher et al. | Oct. 26, 1929 |
| 2,095,638 | Jeffreys | Oct. 12, 1937 |
| 2,202,161 | Miner | May 28, 1940 |
| 2,222,306 | Atwood | Nov. 19, 1940 |
| 2,326,425 | Artzberger | Aug. 10, 1943 |
| 2,424,003 | Tanner et al. | July 15, 1947 |
| 2,447,814 | Novak | Aug. 24, 1948 |

OTHER REFERENCES

Jour. Bact., July 1, 1941, pages 151–152. By Tittsler et al.